3,751,566
PREPARATION OF ALUMINUM HYDRIDE BY REACTION OF AN ALKALI METAL HYDRIDE WITH BORON TRICHLORIDE
John W. Churchill, Mount Carmel, Conn., assignor to the United States of America as represented by the Secretary of the Army
No Drawing. Filed Jan. 15, 1969, Ser. No. 791,527
Int. Cl. C01b 6/00
U.S. Cl. 423—645    10 Claims

ABSTRACT OF THE DISCLOSURE

A novel process for the preparation of aluminum hydride. The process utilizes the reaction of an alkali metal aluminum hydride with a boron trihalide. Typically, the alkali metal is sodium or lithium and the halogen is chlorine. The process is conducted in the presence of an ether such as diethyl ether, followed by removal of the precipitate of the alkali metal halide, dilution of the solution with an aromatic solvent, and heating to remove ether, effect crystallization and convert to the stable form of aluminum hydride. The product is useful as a solid propellant ingredient.

BACKGROUND OF THE INVENTION

This invention relates to a novel and improved process for the preparation of aluminum hydride.

Many processes for synthesizing aluminum hydride have been demonstrated. One of these processes involves the reaction between aluminum chloride and lithium aluminum chloride:

$$3LiAlH_4 + AlCl_3 \rightarrow 4AlH_3 + 3LiCl\downarrow$$

Although many variations of this process exist, a typical process involves dissolving lithium aluminum hydride (1.098 gram moles) in 1.75 liters of ether, adding ethereal aluminum chloride (0.315 gram moles in 250 ml. ether) dropwise over a thirty minute interval to the lithium aluminum hydride solution, stirring after aluminum chloride addition is completed, filtering into a holding vessel, and adding toluene (1.6 liters) and an ethereal lithium borohydride solution (0.0642 gram of $LiBH_4$/gram of theoretical $AlH_3$) to 1.6 liters of the filtrate in the holding vessel. A precipitate occurs and the ether-toluene solution is filtered again to obtain a clear solution prior to the stripping-conversion step.

The stripping is conducted by first reducing the pressure in the distillation system to 310 mm. Hg and cooling the receiver with Dry Ice. An oil-bath pre-heated to 60° C. is placed around the flask while stripping is continued until the internal pressure is 125–150 mm. Hg at a pot temperature of 45–50° C. The weight percent ether in the solution is 1.2 to 3.6 percent when stripping is discontinued.

The system is brought to atmospheric pressure by the addition of nitrogen, and the conversion cycle is conducted by heating the solution from 50 to 95° C. over a one-hour interval and maintaining it at 95–100° C. for 75 minutes. When the solution reaches 80° C., mercury (5 ml.) is added for product stabilization.

The solution is cooled; the supernatant toluene is decanted along with any fine gray particles from the product. (All decantations and washings of the product are conducted in a dry box under an atmosphere of nitrogen.) The solid product is given a quick rinse with 250 ml. of ether to remove the excess $LiAlH_4$ and $LiBH_4$, and then magnetically stirred for 30 minutes in 500 ml. of ether. The ether is decanted along with the fine particles followed by several slurrying and decantations with 100 ml. of ether. The product is then dried under vacuum at room temperature for 24 hours and sieved through 70 and 400 mesh screens. The 70–400 mesh fraction is the final product.

Since the solution from which the aluminum hydride is crystallized contains $LiBH_4$ as well as $LiAlH_4$, it was of interest to examine the possibility of preparing the $LiBH_4$ in situ. This is because the in situ production of $LiBH_4$ represents a worthwhile cost advantage.

Accordingly, it is an object of this invention to provide and improved process for the production of aluminum hydride.

It is a particular object of this invention to provide such a process wherein $LiBH_4$ is one of the reactants.

It is another particular object of this invention to provide such a process wherein the appropriate quantity of $LiBH_4$ is produced in situ from a cheaper precursor.

SUMMARY OF THE INVENTION

Granular unsolvated macrocrystalline aluminum hydride may be prepared by the reaction of a boron halide such as boron trichloride or trifluoride with $MAlH_4$ (M is an alkali metal) in the presence of an ether such as diethyl ether. This is followed by removal of the precipitate of the alkali metal halide, dilution of the solution with an aromatic solvent, and heating to remove ether, effect crystallization and convert to the stable form of aluminum hydride.

DESCRIPTION OF THE PREFERRED EMBODIMENTS

Granular unsolvated aluminum hydride may be prepared by the reaction of a salt having the formula $MAlH_4$ (M is an alkali metal) with a boron trihalide such as $BCl_3$, using an ether solvent such as diethyl ether. The salt is typically $LiAlH_4$ or $NaAlH_4$. After the reaction, the precipitate (e.g., LiCl or NaCl) is removed by filtration. The solution is then heated to effect removal of the ether, crystallization and conversion to the stable form of aluminum hydride.

The process of this invention may be represented by the following equation:

$$5LiAlH_4 + BCl_3 \rightarrow LiBH_4 + 4AlH_3 + LiAlH_4 + 3LiCl\downarrow$$

After removal of the precipitated LiCl, the solution is diluted with toluene and treated in the conventional manner (discussed in the examples) to obtain the product which is then washed with diethyl ether to remove the $LiBH_4$ and $LiAlH_4$.

The following satisfactory working examples are illustrative of the process of this invention:

Example I (vacuum-atmospheric distillation)

Lithium aluminum hydride (750 ml. of a 0.67 molar diethylene ether solution) is placed in a one liter three-necked flask. The flask is equipped with a magnetic stirrer, reflux condenser and gas inlet tube. With the reaction temperature maintained at 10–17° C., 11.2 g. (0.096 mole) of $BCl_3$ is added by means of the gas inlet tube to the mixture over a 1.5 hour period. After $BCl_3$ addition is complete, the mixture is allowed to warm to room temperature with stirring. The material is then filtered into a 3 liter flask containing 1500 ml. of dry toluene. After standing ½ hour this solution is refiltered into a 3 liter three-necked flask. The flask is equipped with a "Lew magnetic stirrer" and distillation head with Dry Ice cooled receiver. Heating is accomplished by means of an oil bath. Removal of the ether is done by vacuum distillation under the conditions shown below:

| Time (hours) | Vessel temperature, °C. | Heat temperature, °C. | Pressure, mm. Hg |
|---|---|---|---|
| 0 | 35 | 26 | 270 |
| 0:20 | 47 | 44 | 250 |
| 1:10 | 56 | 52 | 210 |
| 1:30 | 54 | 51 | 175 |
| 1:45 | 53 | 49 | 130 |

At this point nitrogen is admitted until the pressure reaches atmospheric. The heat is turned up to bring the temperature up to 95–100° C.

Time (hours): Vessel temperature, °C.
2:00 ——————————————————— 76
2:13 ——————————————————— 95
2.30 ——————————————————— 97.5
2:45 ——————————————————— 98

The flask is taken out of the oil bath and cooled. The toluene is decanted off and the solid product filtered and washed with 50 ml. of ether on the filter. The resulting solid is washed for 20 min. with 200 ml. of ether, filtered and dried under vacuum.

Weight of dried product 8.0 g.–67% yield. X-ray shows it to be 100% aluminum hydride (58). (The various forms of unsolvated aluminum hydride are named according to the maximum absorption in the infrared, e.g., aluminum hydride (58) absorbs strongest at 5.8 microns.)

Analysis of mother liquor and ether washings shows:

Mole ratio, $LiBH:AlH_3$, 1:3.85
Mole ratio, $LiAlH_4:AlH_3$, 1:1.73

Example II (atmospheric pressure distillation)

Into a one liter three necked flask equipped with magnetic stirrer, reflux condenser and gas inlet tube is charged 750 ml. of a 0.97 molar $LiAlH_4$ solution in ether. While maintaining a reaction temperature of 4–13° C., 17.1 g. (0.1475 mole) of $BCl_3$ is added by means of the gas inlet tube over a period of 1.1 hours. After the synthesis solution warms to room temperature, 650 ml. of the solution are filtered into a 3-liter, 3-necked flask containing 1300 ml. of dry toluene. The flask is equipped with a "Lew" magnetic stirrer and distillation head. The stripping and desolvation is done under the conditions shown below.

| Time (hours) | Bath temperature, °C. | Vessel temperature, °C. | Head temperature, °C. | Pressure |
|---|---|---|---|---|
| 0 | 55 | 32 | 33 | Atmospheric. |
| 0:20 | 64 | 50 | 35 | |
| 0:40 | 81 | 66 | 42 | |
| 1:00 | 96 | 74.5 | 67.5 | |
| 1:20 | 100 | 86 | 77 | Product precipitated. |
| 1:30 | 100 | 89 | 79 | |
| 1:45 | 110 | 95 | | |
| 2:00 | 110 | 98 | 87 | |
| 2:15 | 105 | 99 | 50 | |

The reaction is then taken out of the oil bath and cooled. The product is filtered from the toluene solution, washed with 300 ml. of ether filtered from the wash solution and dried under vacuum.

Weight of dried product 14.5 g., X-ray showed 70% aluminum hydride (57), 30% aluminum hydride (58).

Example III

Boron trifluoride is used in place of $BCl_3$; however, the yield is decreased greatly due to the formation of unreactive $AlF_3$. In place of the 1300 or 1500 ml. of toluene used which gives a 2/1 toluene/diethyl ether ratio a 1/1, 3/1, 4/1 or 6/1 ratio is substituted; however, the preferred ratio is the 2/1.

The preferred excess of $LiAlH_4$ to $AlH_3$ is ¼ or 25% mole percent excess; however, this excess can be varied from 5 to 35%.

Essentially, Example 1 involves fractional distillation of the ether in a vacuum at about 50° C./170 mm.; Example 2 involves fractional distillation at atmospheric pressure at about 95° C./760 mm. Example 1 is termed the "standard vacuum-atmospheric process" and Example 2 is termed the "standard atmospheric process." Example 3 can be achieved either in a vacuum-atmospheric process or in an atmospheric process.

The use of toluene-ether as the reaction medium in place of pure ether permits the use of a higher reaction temperature, 45–50° C., which apparently is responsible for the increased rate of reaction.

Aromatic solvents, such as benzene, toluene or xylene, in contrast to aliphatics, are found to be effective for retaining aluminum hydride in ethereal solution, thus promoting the growth of macrocrystalline aluminum hydride.

The use of ethers other than diethyl ether has been explored for the process of this invention. With the exception of allyl ether, all ethers appear to be quite similar in their action, varying somewhat because of basicity and steric factors.

I claim:
1. A process for the preparation of aluminum hydride comprising the steps of reacting in solution a compound of the formula $MalH_4$, M representing an alkali metal, with a boron trihalide in the presence of an ester, removing the alkali metal halide precipitate formed thereby, diluting said solution with an aromatic solvent, heating and distilling said solution until said ether is substantially removed by means of a distillation process, and separating said aromatic solvent from said aluminum hydride.

2. The process of claim 1 wherein said aromatic solvent is toluene.

3. The process of claim 2 wherein said alkali metal is sodium.

4. The process of claim 2 wherein said alkali metal is lithium.

5. The process of claim 4 wherein said ether is diethyl ether.

6. The process of claim 5 wherein said boron trihalide is boron trichloride.

7. The process of claim 6 wherein the said distilling is accomplished under vacuum.

8. The process of claim 6 wherein said distillation process is performed at about 50° C. and about 170 millimeters of mercury pressure, followed by heating at about atmospheric pressure at about 95° C.

9. The process of claim 8 wherein said aluminum hydride is washed with diethyl ether after being separated from said toluene.

10. The process of claim 6 wherein said distillation process is performed at about atmospheric pressure and about 95° C., and wherein after said separating, said aluminum hydride is washed with diethyl ether after being separated from said toluene.

References Cited
UNITED STATES PATENTS 2,920,935 1/1960 Finholt ———————— 23—204 X
3,387,933 6/1968 Snyder ———————— 23—204
2,804,397 8/1957 Goodman ———————— 423—645 X

OTHER REFERENCES

Finholt et al.: J. Am. Chem. Soc., vol. 69.

CARL D. QUARFORTH, Primary Examiner

P. A. NELSON, Assistant Examiner